UNITED STATES PATENT OFFICE.

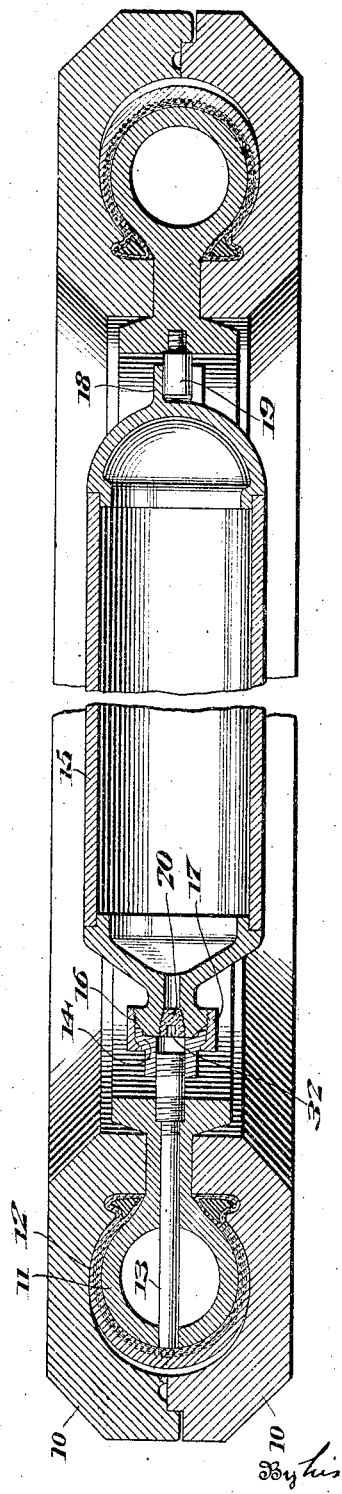

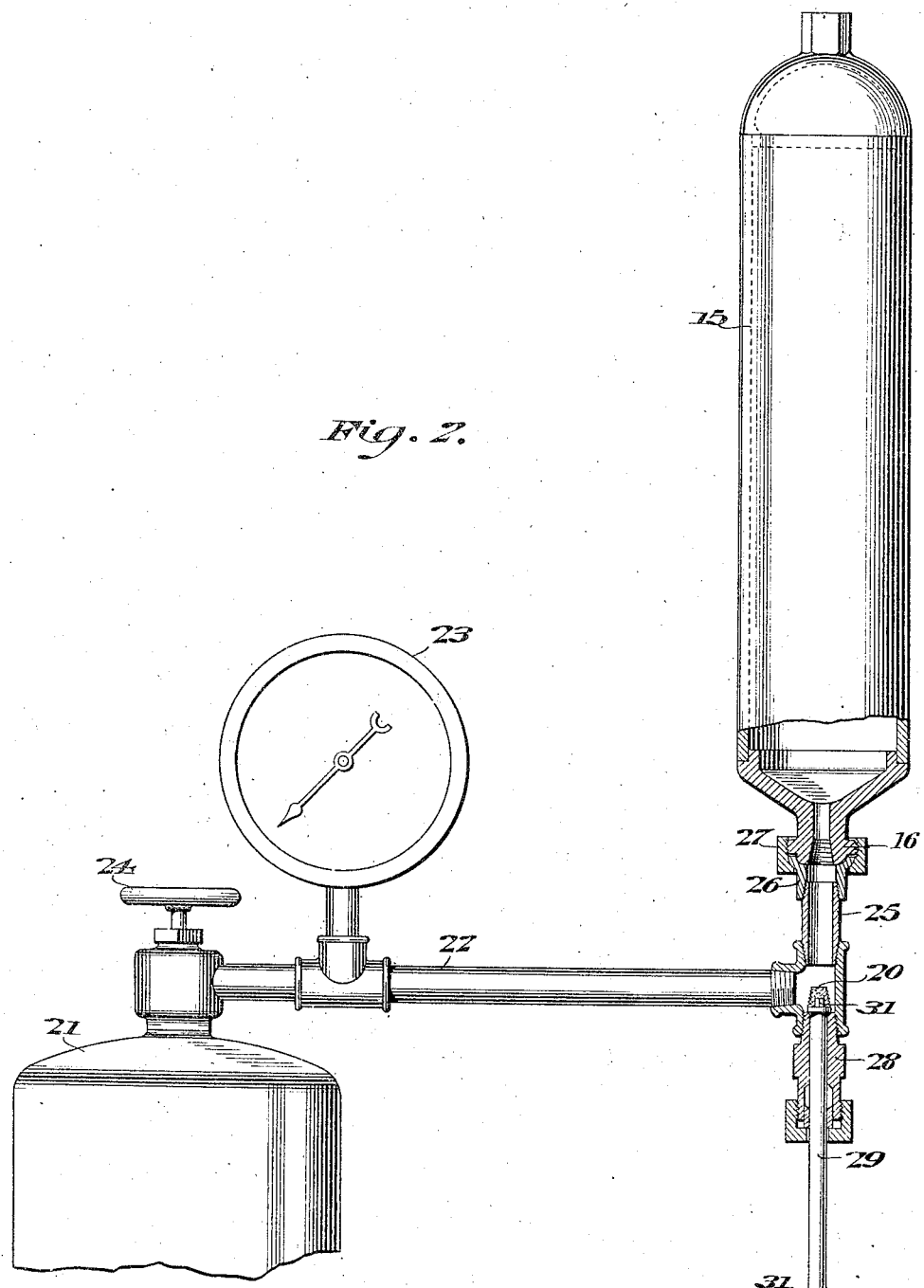

JOHN R. GAMMETER, OF AKRON, OHIO, ASSIGNOR TO THE B. F. GOODRICH COMPANY, OF NEW YORK, N. Y., A CORPORATION OF NEW YORK.

FLUID-PRESSURE VULCANIZING APPARATUS.

1,200,603.   Specification of Letters Patent.   Patented Oct. 10, 1916.

Application filed February 25, 1914. Serial No. 820,898.

*To all whom it may concern:*

Be it known that I, JOHN R. GAMMETER, a citizen of the United States, residing at Akron, in the county of Summit and State of Ohio, have invented certain new and useful Improvements in Fluid-Pressure Vulcanizing Apparatus, of which the following is a specification.

This invention relates to the curing of hollow rubber articles while subjected to internal fluid pressure, and it relates more particularly to the means for furnishing the pressure. While applicable to hollow rubber articles generally, the embodiment of my invention herein illustrated is designed more particularly for the blowing of tire casings by means of gaseous pressure so as to stretch or distend the fabric while the rubber is in a raw or partly vulcanized condition, to prevent buckling of the plies, to remove any wrinkles therein, and to place and maintain the fabric threads under uniform tension and allow them to become set in this condition by the vulcanized rubber.

One of my objects is to avoid the use of fluid connections between the molds located within a vulcanizing pot and an external source of pressure. I prefer to employ a suitable gas such as carbon dioxid for the pressure medium, and my invention includes means, such as a fusible plug or other device controlled by the temperature of the heating medium employed in vulcanization, for automatically admitting the fluid pressure to the interior of the tire casing as soon as the steam or other heating medium is turned on. The pressure fluid may be confined in any suitable chamber, but I prefer to store it in a flask or tank which may be conveniently coupled with or uncoupled from a fluid passage-way in the mold core and may be supported in a diametrical position across the annulus or ring constituting said core, the flask thus occupying a protected position and allowing the molds to be stacked and handled in the ordinary way.

Of the accompanying drawings, Figure 1 represents a cross-sectional view of a mold and flask organized in accordance with my invention for the purpose of blowing a tire casing during vulcanization, the casing being shown in place in the mold. Fig. 2 represents a side elevation, partly in section, showing a device for charging the flask and closing its outlet with a fusible plug.

In the drawings 10, 10 are the two halves forming the outer section of the mold and 11 is the internal core or ring upon which the tire casing 12 may be formed in the ordinary manner by means of plies or layers of rubberized fabric and a rubber tread. The innermost ply of the carcass is coated on the inside with a sufficient thickness of rubber compound to make it impervious, and the tire beads or edges form a fluid tight packing between the core and outer mold to prevent the escape of the fluid. While the core or mandrel 11 may be made hollow for the sake of lightness, I prefer to admit the pressure only between the outer surface of said core and the inner surface of the tire, and have shown a radial pipe or passageway 13 extending from the inner to the outer periphery of the core and provided at the inner periphery with one member 14 of a detachable coupling or union for forming a fluid-tight connection with the gas tank or flask 15, the mouth of said flask having the complemental member 16 of said union externally threaded to engage the internally threaded coupling ring 17. The rear end of the flask is formed with a socket member 18 open on its lower side and resting on a stud 19 attached to the inner periphery of the core opposite the coupling member 14, said stud, when the parts are normally positioned, being slightly withdrawn from the bottom of the socket member 18 so that the flask may be slid to the right to disengage the complementally-tapered coupling members 14, 16 in detaching the flask.

The mouth of the flask 15 is internally screw-threaded to receive a threaded plug or closure 20 made of an alloy which melts at or near the temperature of 212° F., and this plug, it will be noted, is housed in relatively thin metal walls exposed to the action of steam in the vulcanizing chamber (not shown) in which the mold is adapted to be placed. The said plug 20 has the function of a destructible thermostatic valve or closure as will be more fully explained.

Fig. 2 represents an apparatus for charging the flasks under pressure and inserting the fusible sealing plugs. 21 is a main charging tank having an outlet pipe 22 with a pressure gage 23 in branch connection therewith and a hand-valve 24. 25 is a cross-pipe or T at the end of the pipe 22 having on its upper branch suitable coupling members 26, 27 forming a union with the member 16 of the flask, and having in its lower branch a stuffing box 28 forming a guide for a slidable and rotatable stem 29, the latter having a handle 131 at its outer end and at its inner end a squared projection 31 adapted to enter a complemental socket 32 (Fig. 1) in the outer end of the fusible plug 20. In charging one of the flasks 15, the stem 29 will be pushed out through the upper branch of the T 25 to receive a fusible plug 20 and then lowered, after which an empty flask is coupled on and charged with gas from the main tank 21 to the desired pressure as indicated on gage 23, and then the fusible plug 20 is raised and screwed into the threaded opening in the mouth of the flask by means of the stem 29 so as to retain the pressure. The charged flask is then uncoupled and ready for service. While this illustrates a preferred mode of sealing the charged flask, it will be understood that any suitable means may be employed to this end, and I do not wholly confine myself to a fusible closure as the temperature-controlled means for retaining the stored fluid pressure.

When a forming core 11 with a raw tire thereon has been placed in the outer mold and the mold parts closed thereon and a charged flask 15 coupled in place, as represented in Fig. 1, the assembled unit is then ready to be placed in the vulcanizing pot, and the units may be handled and stacked in the ordinary way. It will be noted that the tire 12 is somewhat smaller in diameter than the inner diameter of the mold 10 so that a free space is left for its distention under internal pressure. When steam is admitted to the space surrounding the mold, its heat almost immediately melts the fusible plug 20 and releases the gas confined under pressure in the flask 15, thereby admitting this pressure through the passageway 13 to the interior of the tire casing. This pressure is sufficiently great to distend the tire casing and cause the latter to completely fill the mold, the threads of the fabric forming the carcass being thereby placed under uniform tension and the fabric smoothed out so as to avoid buckling and remove any previously-formed wrinkles or other irregularities, while at the same time the rubber and canvas are thoroughly compacted. The small quantity of fusible plug metal which has been blown into the tire may readily be removed after the tire has been stripped from the core. When the flask or storage chamber is external to the mold as shown, so as to be directly exposed to the heating medium, the heat of the latter has its maximum effect in adding to the pressure of the expanding medium.

While the idea of a flask or other storage chamber forming a portable unit with the mold may be utilized in various ways, as for example, to contain a gas-forming powder or liquid adapted to be affected by the temperature of the vulcanizing medium, to inject a gas or liquid under pressure into the tire, I prefer to confine a previously-formed gas under pressure and release it by the melting of a fusible member, as this results in distending the tire almost immediately on bringing steam in contact with the mold and prevents the entrance of water of condensation between the mold and the outer surface of the tire, the expansion of the tire causing it to fill the mold and force out any air through the mold crevice or other vent. I have also found that a gas such as carbonic acid gas gives better results than steam or water, one of the advantages being that it is less liable to produce injurious permeation of the fabric. It is not however, essential in all cases to introduce the gas directly into the tire, as any suitable fluid medium impelled by gaseous pressure or other pressure and released by a temperature-responsive device comes broadly within the scope of my invention, as do also various modifications which might be made in the idea of using a portable pressure molding unit.

It will be understood that any suitable form of mold or inclosure for the tire may be employed, and any suitable means may be provided for rendering its inner surface impervious and packing its edges, and in the case of articles other than open-sided tire casings the character of the apparatus employed may be modified to suit the nature of the article and the conditions of treatment.

I claim:

1. Vulcanizing apparatus comprising a confining outer mold or envelop for the distensible rubber article, a fluid-pressure chamber for storing the distending medium, connected with the interior of the mold by a passage, and temperature-responsive means controlling said passage.

2. Vulcanizing apparatus comprising a confining outer mold or envelop for the distensible rubber article, a fluid-pressure chamber for storing the distending medium, connected with the interior of the mold by a passage, and a fusible member controlling said passage, and adapted to be melted by the temperature of steam.

3. Vulcanizing apparatus comprising an annular mold adapted to hold a tire to be vulcanized and consisting of an outer mold member and an inner core, a chamber supported by and forming a portable unit with said core and adapted to store fluid under pressure for injection through the core into the tire, and a passage adapted to connect said chamber with the interior of the tire in said mold.

4. Vulcanizing apparatus comprising an annular mold adapted to hold a tire to be vulcanized, and a detachable fluid-pressure flask supported by and forming a portable unit with said mold and adapted to inflate the interior of a tire held in the mold.

5. Vulcanizing apparatus comprising an annular mold for a tire-casing, said mold comprising side members forming the outer-mold section and a ring for location between the beads of the casing, and a pressure flask detachably secured to said ring for inflating the tire.

6. Vulcanizing apparatus comprising an annular tire mold, and a pressure flask supported by and between opposite points on the inner periphery of said mold.

7. Vulcanizing apparatus comprising an annular tire mold, and a pressure flask radially supported within the inner periphery of said mold and having a passage connecting its interior with that of the mold and provided with a detachable coupling.

8. Vulcanizing apparatus comprising an annular tire mold having a fluid passage provided with a coupling member, a pressure flask mounted diametrically in the plane of said mold and having an outlet at one end provided with a complemental coupling member, and a supporting slip-connection between the mold and the opposite end of said flask, permitting the disconnection of the coupling members.

9. Vulcanizing apparatus comprising a holder for the article to be vulcanized, a fluid-pressure reservoir having an outlet passage for inflating the article so held, and a fusible closure for said passage adapted to be melted by the heat of the vulcanizing medium.

10. Vulcanizing apparatus comprising a mold, a portable flask having an outlet connected therewith, and a fusible plug in said outlet.

11. Vulcanizing apparatus comprising a mold, a hollow fluid-pressure container or flask having a metallic heat-conductive neck formed with a fluid-outlet passage connecting with the interior of the mold, and a fusible plug in said passage.

12. Vulcanizing apparatus comprising a mold, a hollow fluid-pressure container or flask having a projecting metal-walled outlet or neck connecting with the interior of the mold, and a fusible plug forming a closure for said outlet, adapted to be melted by rapid heat-conduction through the walls of said outlet from an external heating medium.

13. Vulcanizing apparatus comprising a tire mold and a fluid-pressure chamber forming a portable unit therewith, a passage connecting said chamber with the interior of the mold and having a metal-walled part exposed exteriorly to the heat of the surrounding medium, and a fusible plug or closure in the exposed part of said passage.

14. Vulcanizing apparatus comprising a mold for a distensible rubber article, a fluid-pressure flask external to said mold and detachably connected therewith by an exposed metal outlet-neck, and a fusible plug in said neck.

15. Vulcanizing apparatus comprising an annular portable tire-mold, having an inlet-passage provided with a coupling member, and a pressure flask diametrically mounted in the plane of said mold and having a projecting outlet-neck formed with a complemental coupling member and containing a fusible closure.

16. A mandrel provided with a chamber adapted to store fluid under pressure, and a thermostatic valve opening to the face of the mandrel and adapted to open and liberate the stored fluid at a temperature approaching the vulcanizing temperature.

17. A mandrel provided with a chamber adapted to store fluid under pressure, such chamber having a thermostatic closure adapted to open and liberate the stored fluid under vulcanizing conditions.

In testimony whereof I have hereunto set my hand in the presence of two subscribing witnesses, this 30 day of January, 1914.

JOHN R. GAMMETER.

Witnesses:
R. M. PIERSON,
WALKER K. MEANS.